UNITED STATES PATENT OFFICE.

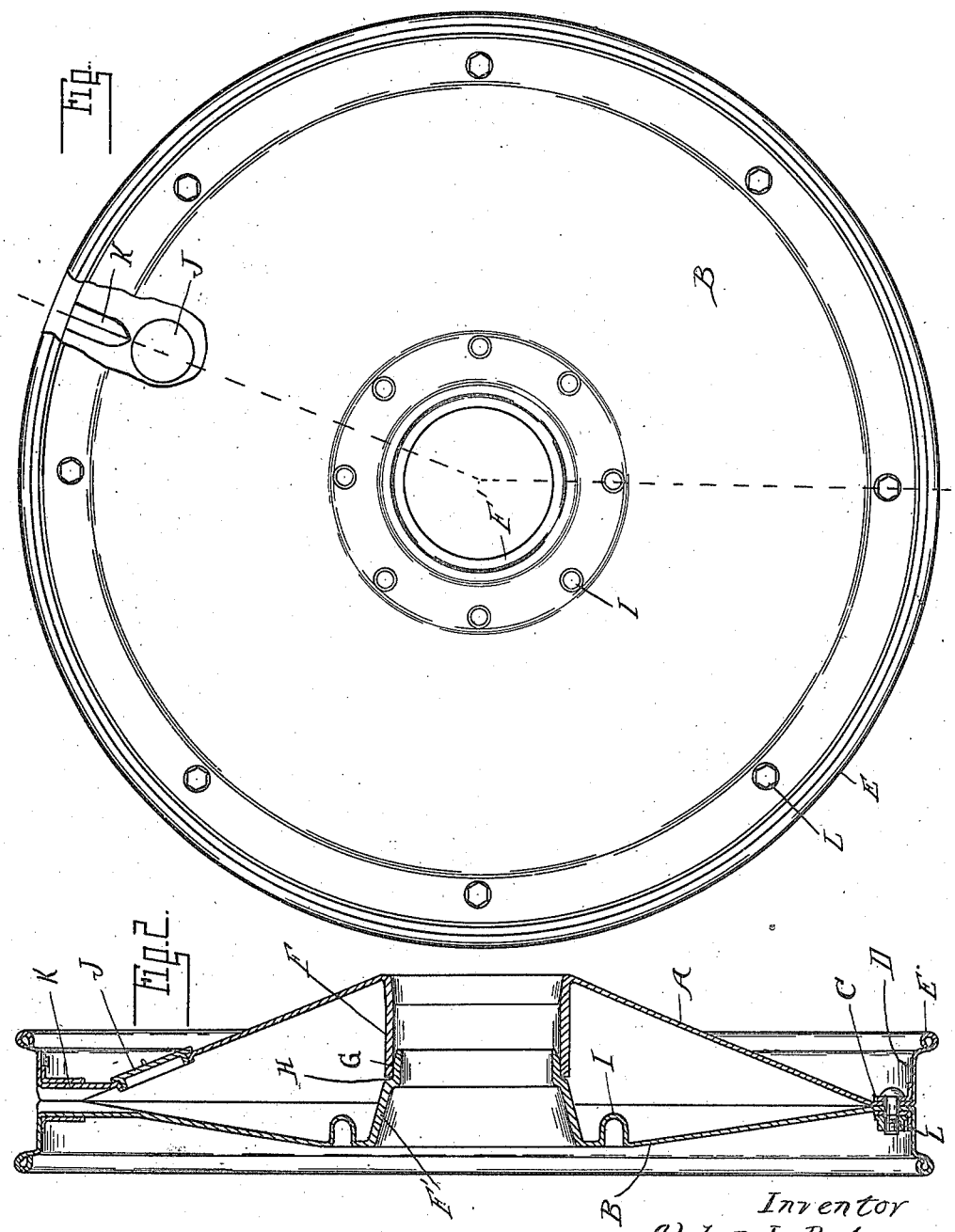

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

VEHICLE-WHEEL.

1,255,927.                     Specification of Letters Patent.     Patented Feb. 12, 1918.

Application filed March 31, 1916. Serial No. 87,954.

*To all whom it may concern:*

Be it known that I, ALDEN L. PUTNAM, a citizen of the United States of America, residing at Detroit, in the county of Wayne and State of Michigan, have invented certain new and useful Improvements in Vehicle-Wheels, of which the following is a specification, reference being had therein to the accompanying drawings.

The invention relates to vehicle wheels, and comprises the novel construction as hereinafter set forth. In the present state of the art, the wheels used upon automobile pleasure cars are generally of two types,—viz. wooden spoke or compression spoke, and wire or suspension spoke wheels. With the latter type there is more of a tendency to accumulate mud between the spokes, and to avoid this shields or coverings have been provided, which house the spokes and present an unbroken surface from the rim to the hub. Such coverings are usually formed of light gage metal and perform no function other than that of a protection for the housed members. It is the object of the present invention to obtain a simplified construction of wheel, having all the advantages of the protected wheel just described, by dispensing with the wire spokes and using only the sheet-metal between the hub and the rim. It is a further object to obtain a construction which may be formed of pressed sheet metal, and which combines strength with lightness; still further to form the wheel of complementary sections having abutting hub portions and secured to each other at the periphery; and still further to obtain various features of advantage as hereinafter set forth.

In the drawings:

Figure 1 is a side elevation partly in section; and

Fig. 2 is a section on line x—x Fig. 1.

In detail, A and B are complementary pressed sheet-metal disks provided with abutting portions C adjacent to the periphery, and opposite laterally-extending rim flanges D terminating in the outwardly-extending flanges E forming a seat for the tire or demountable rim. Each disk is provided at its center with an inwardly-extending hub portion F and F', these hubs being formed of metal of a heavier gage, so as to provide the requisite strength, and being preferably fashioned to telescopically engage each other at G with abutting shoulders H. The hubs may be formed either from the same blank, which is provided with a heavy gage portion, or, preferably, from separate blanks which are welded or otherwise secured to the disks.

With the wire spoke wheels it is usual to form the hub of separable sections, so that the wheel carrying the tire is demountable as a unit from the inner hub section, there being provided a detachable clamping and driving engagement between the two hub sections. With my improved construction I also employ a two-part hub, the outer hub being formed by the members F and F', which are so fashioned as to telescopically engage the inner section (not shown). To couple the sections and to form the driving engagement there is pressed in or united to the disk B a series of sockets I adapted to receive the driving pins (not shown).

With the spoked wheel, whether of the wooden or wire type, the filler tube for the tire passes through the felly and is accessible between spokes. With the disk covers, this filler tube would be concealed, and I therefore provide a removable cap J for access to the space within the disks, this being arranged adjacent to channel portions K which receive the filler tube.

To secure the disks to each other, a series of clamping bolts L are arranged around the abutting portions C and pass through registering apertures therein. When these bolts are removed the two sections of the wheel may be readily separated from each other, which facilitates the engagement or removal of the tire.

A wheel constructed as described has the same appearance as the covered wire wheel and can be manufactured at a greatly reduced cost. It is as readily mounted upon and demounted from the hub as the wire wheel, and has a distinct advantage over the latter in facilitating engagement and disengagement of the tires.

What I claim as my invention is:

1. A vehicle wheel, comprising two complementary sheet-metal disk sections provided with oppositely, inwardly-extending hub sections telescopically engaging each other, and peripheral clamping means for said sections.

2. A vehicle wheel, comprising two complementary sheet-metal disk sections provided with oppositely, inwardly-extending hub sections of heavier gage, detachably engaging each other, complementary integral rim sections for engaging the tire, and means for peripherally clamping said disks to each other.

3. A vehicle wheel, comprising two complementary dished sheet-metal disk sections, each section being provided with an inwardly-extending hub portion of heavier gage, said hub portions telescopically engaging and abutting against each other, complementary rim sections integral with said disks, having outwardly-extending cheek flanges for engaging the tire, and clamping means engaging abutting peripheral portions of the disks for holding said disks together.

4. A vehicle wheel, comprising two complementary dished sheet-metal disk sections, each section being provided with an inwardly-extending hub portion and a laterally-extending rim portion, said hub portions telescopically engaging and abutting against each other, peripheral clamping means for holding said sections together, and a socket pressed in the inner disk section to receive a driving member for the wheel.

5. A vehicle wheel, comprising complementary dished sections peripherally clamped to each other and having complementary outwardly extending rim portions, said sections being provided with inwardly-extending abutting hub portions fashioned to be sleeved upon a complementary hub section.

6. A vehicle wheel comprising two complementary dished sheet-metal disk sections, having telescopically engaged inwardly extending hub portions, and complementary outwardly extending rim portions, said sections abutting adjacent said rim portions, and means for clamping together the abutting portions of said sections.

7. A vehicle wheel, comprising two complementary dished sheet-metal disk sections, each section being provided with an inwardly extending hub portion, said hub portions telescopically engaging and abutting against each other, peripheral clamping means for holding said sections together, and a socket pressed in the inner disk section to receive a driving member for the wheel.

In testimony whereof I affix my signature.

ALDEN L. PUTNAM.